(No Model.)
H. C. DEANE.
TRANSFER TRUCK.
No. 605,162. Patented June 7, 1898.
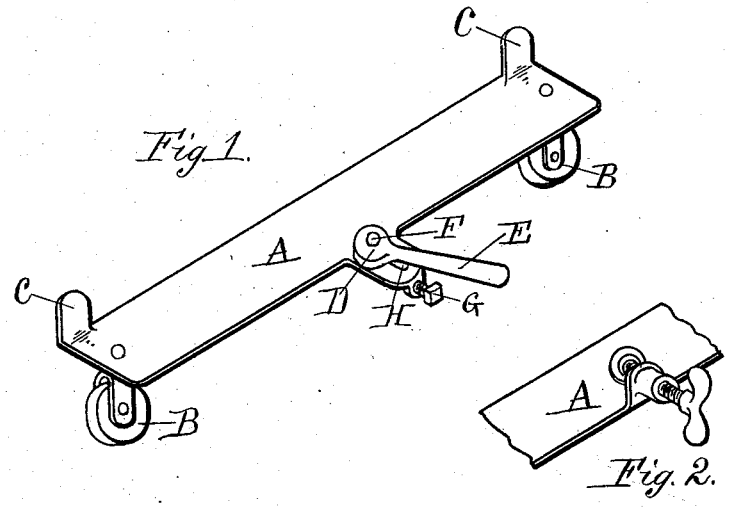
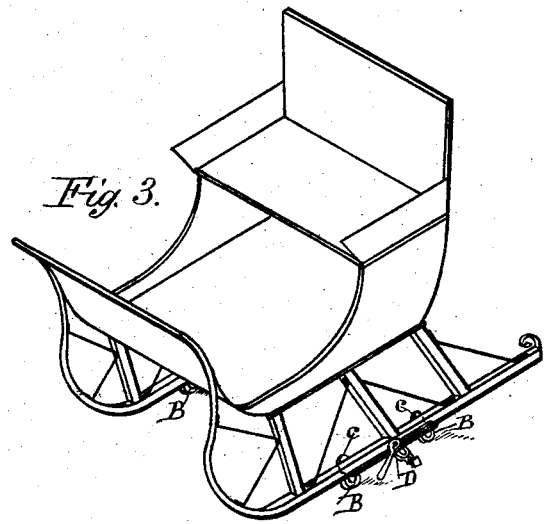
Witnesses:
H. G. Manning
M. K. Harris
Inventor:
Herbert C. Deane

UNITED STATES PATENT OFFICE.

HERBERT C. DEANE, OF FITCHBURG, MASSACHUSETTS.

TRANSFER-TRUCK.

SPECIFICATION forming part of Letters Patent No. 605,162, dated June 7, 1898.

Application filed March 1, 1897. Serial No. 625,678. (No model.)

*To all whom it may concern:*

Be it known that I, HERBERT C. DEANE, a citizen of the United States, residing at Fitchburg, in the county of Worcester and State of Massachusetts, have invented a new and useful Transfer-Truck, of which the following is a specification.

My invention is designed to facilitate the moving of articles to which a roller-carriage may be clamped, such as the runners of sleighs or any sliding body, the weight of which does not allow it to be otherwise easily moved.

Figure 1 is a perspective view of the roller-carriage, showing an adjustable cam-clamp. Fig. 2 is a perspective view of the middle part of roller-carriage as shown in Fig. 1, showing a thumb-screw clamping device. Fig. 3 shows the roller-carriage attached to runners of a sleigh as it would ordinarily be used.

My invention consists of the body A, to which the swiveling wheels B B are attached at each end. The clamping-braces C C are attached rigidly to each end of body A. In the center of one side of body A and on the opposite side to braces C C is the cam D, having handle E. Cam D turns on F, which is held in a nut attached to screw G, by means of which cam D may be moved in or out in slot H in body A.

The operation of my device is as follows: The roller-carriage is attached to any part of an object to be moved, such as the runners of a sleigh, as shown in Fig. 3. The braces C C are placed on one side of the runner, and cam D so adjusted as to clamp the runners to carriage firmly when handle E of cam D is moved in that direction. If preferable, the clamping device may be of the construction shown in Fig. 2 or any equivalent device.

Having thus described my invention, what I claim, and what I desire Letters Patent for, is—

1. In a transfer-truck, the combination with the body of the same, of ears or lugs formed upon one side thereof, an adjustable pintle upon the other side, and a cam swiveled upon said pintle to clamp the truck to the article desired.

2. In a transfer-truck, the combination with the body portion thereof, of ears or lugs formed upon one side of the same, an extension upon the other side formed with a longitudinal slot, a bolt having a pintle passing through said slot, a screw passing through a hole tapped through the end of said extension and engaging said bolt to adjust the pintle in the slot, a cam swiveled upon said pintle, and a lever to operate the cam.

HERBERT C. DEANE.

Witnesses:
H. G. MANNING,
RODNEY B. WARE.